No. 690,236. Patented Dec. 31, 1901.
C. W. COLWELL.
COW TAIL HOLDER.
(Application filed Nov. 23, 1900.)

(No Model.)

Witnesses
Elmer Seavey
F. S. Bolt

Inventor
Chas. W. Colwell
By Mason Fenwick Lawrence
Attorneys.

UNITED STATES PATENT OFFICE.

CHARLES W. COLWELL, OF DELHI, NEW YORK.

COW-TAIL HOLDER.

SPECIFICATION forming part of Letters Patent No. 690,236, dated December 31, 1901.

Application filed November 23, 1900. Serial No. 37,509. (No model.)

*To all whom it may concern:*

Be it known that I, CHARLES W. COLWELL, a citizen of the United States, residing at Delhi, in the county of Delaware and State of New York, have invented certain new and useful Improvements in Cow-Tail Holders; and I do hereby declare the following to be a full, clear, and exact description of the invention, such as will enable others skilled in the art to which it appertains to make and use the same.

My invention relates to cow-tail holders; and it consists of two resilient members constructed, preferably, of wire and which are pivoted to a suitable rod by coiling the members around the same, so as to give a spring action to said members, so that when the device is operated to receive the tail of an animal and then further operated to receive the leg of the animal the tail will be gripped by said movement, and by releasing the fingers of the operator the tendency of the two members to assume a contracted condition will also grip the leg of the animal.

The object of my invention is the production of a cow-tail holder which is very simple in construction and operation and cheap in its production and which will not annoy the cow or interfere with the milking operation and which can be readily attached and detached.

Figure 1:
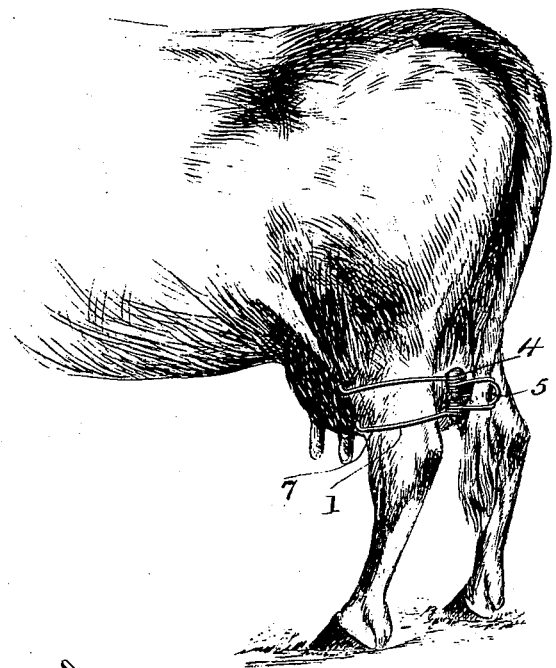
Figure 2:
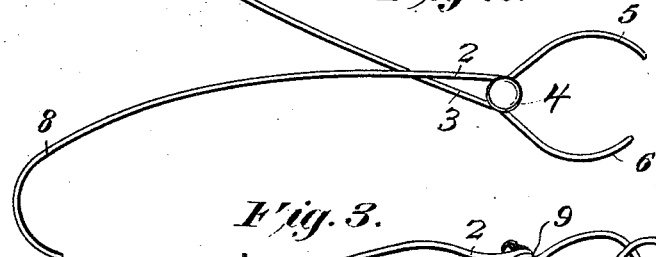
Figure 3:
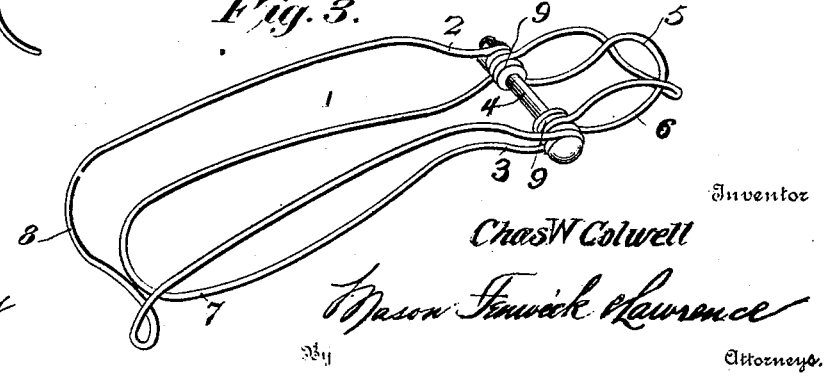

In the accompanying drawings, Figure 1 is a perspective view of a portion of a cow, showing my improved holder applied to the tail. Fig. 2 is a top plan view of the device. Fig. 3 is a perspective view of the same.

1 in the drawings represents my improved cow-tail holder, which consists, preferably, of two hinged or pivoted resilient members 2 and 3, respectively, which are constructed, preferably, of wire, each member being formed, preferably, of a single piece of wire, each of which is coiled around a rod 4, so as to give a spring action to the arms or members when the forward portions 5 and 6 thereof are brought together around an object, as a cow's tail, and the outer ends 7 and 8 of the arms or members are spread to receive another object—as, for instance, a cow's leg. By bringing the members into the position shown in Fig. 2 and then bringing the rear ends 7 and 8 of the device together, as shown in Fig. 3, the cow's tail will be gripped between the forward portions 5 and 6 of the device, and by spreading the rear portions 7 and 8 sufficiently to receive the cow's leg and then letting go with the hands the said rear portions 7 and 8 will grip the cow's leg, and the forward portions 5 and 6 will at the same time be gripping the cow's tail. The relative sizes of the portions 5 and 6 and the portions 7 and 8 of the device are made to correspond with the relative sizes or the thickness of a cow's tail and her leg, so that when the device is applied to the tail and the portions 7 and 8 are further spread to receive the cow's leg the cow's tail will not be released by the slight contraction of the portions 7 and 8 when the hands of the operator are removed.

The arms or members 2 and 3 are coiled around the rod 4, as at 9 9, the coils of the member 3 coming inside of and abutting against the coils of the member 2. The coils are held in position by the rod 4 against lateral movement in any suitable manner, one convenient means being a head on the end of the rod or bolt and a nut on the other end thereof. This construction admits of the ready assembling of the parts and the disassembling of the same. The member 3 is made slightly smaller in length and width than the member 2, so as to conveniently operate within the same. As illustrated in the drawings, one of the long arms, as 8, may be given a hook shape at its outer end in order that it may so engage the cow's leg as to prevent the holder from being accidentally pulled therefrom by the twitching of the tail. This structure makes it necessary to spread the long jaws slightly before the holder can be removed from the cow's leg.

I do not wish to limit my invention to the exact construction shown and described, as the same might be slightly varied without departing from the spirit of my invention. I believe I am the first to construct a cow-tail holder of two members pivoted together and so constructed and arranged that when the forward portion of the device is in engagement with a cow's tail and the rear portions of the member are spread to grip a cow's leg and the hands of the operator are removed the said rear portions will tend to contract or come together and grip the leg without releasing the cow's tail.

Having now described my invention, what I claim as new, and desire to secure by Letters Patent, is—

1. A cow-tail holder comprising resilient members pivoted together at a point intermediate their length, and extending beyond the pivot each way to form concaved jaws adapted to surround the leg or tail of a cow, a hook formed on the end of one jaw to engage the leg of the cow so that the holder cannot be accidentally pulled off the said leg, the members being so arranged that the opening of one pair of jaws tends to close the other pair, substantially as described.

2. A cow-tail holder comprising a pivot-pin, a pair of resilient members, each loosely coiled about the said pivot-pin, one of said members being adapted to pass through the other and thereby form gripping-jaws at each end of the said holder, one pair of jaws being capable of spreading sufficiently to receive and grip between them a cow's leg and the other the cow's tail in such a manner that the spreading of one pair of jaws for inclosing the leg will cause the gripping of the tail by the other pair, substantially as described.

In testimony whereof I hereunto affix my signature in presence of two witnesses.

CHARLES W. COLWELL.

Witnesses:
JAMES S. MUIR,
CHAS. R. GEMMEL.